United States Patent [19]

Rose

[11] Patent Number: 4,534,875

[45] Date of Patent: Aug. 13, 1985

[54] METHOD FOR HEAT EXCHANGE FLUIDS COMPRISING VISCOELASTIC SURFACTANT COMPOSITIONS

[75] Inventor: Gene D. Rose, Midland, Mich.

[73] Assignee: The Dow Chemical Company, Midland, Mich.

[21] Appl. No.: 570,577

[22] Filed: Jan. 13, 1984

[51] Int. Cl.³ ............................................... C09K 5/00
[52] U.S. Cl. ..................................... 252/71; 252/75; 252/76; 252/77; 252/79
[58] Field of Search ...................... 252/75, 76, 77, 79, 252/71

[56] References Cited

U.S. PATENT DOCUMENTS

| | | | |
|---|---|---|---|
| 2,541,816 | 2/1951 | Colarum et al. | 564/280 |
| 3,172,910 | 3/1965 | Brace | 562/605 |
| 3,361,213 | 1/1968 | Savins | 166/244 C |
| 3,373,107 | 3/1968 | Rice et al. | 564/463 |
| 3,775,126 | 11/1973 | Babbitt et al. | 430/635 |

FOREIGN PATENT DOCUMENTS 0091086 12/1983 European Pat. Off. .

OTHER PUBLICATIONS

Cho et al., Advances in Heat Transfer, 15, p. 59, (1981).
Barnes et al., Rheol. Acta., 14, p. 53, (1957).
Gravsholt: J. Coll. Interface Sci., 57(3), p. 575, (1976).
Sylvester et al., Ind. Eng. Chem. Prod. Res. Dev., 18, p. 47, (1979).

*Primary Examiner*—John E. Kittle
*Assistant Examiner*—Shah: Mukund J.

[57] ABSTRACT

Heat exchange fluids are improved by incorporating therein a viscoelastic surfactant composition. The viscoelastic surfactant is employed in an amount sufficient to reduce the friction experienced by the heat transfer fluid in a heat transfer apparatus while providing good heat transfer. The improved fluids are useful in district heating applications.

19 Claims, No Drawings

METHOD FOR HEAT EXCHANGE FLUIDS COMPRISING VISCOELASTIC SURFACTANT COMPOSITIONS

BACKGROUND OF THE INVENTION

The present invention relates to a method for providing improved heat transfer fluids for use in heat transfer applications.

In many heating and cooling applications heat is transferred between a heating source and a heat sink by continuously circulating a fluid around a closed loop between the source and the sink. It is desirable to reduce the amount of pipe flow friction (i.e., drag) of the fluid being recirculated and thus reduce the amount of pumping energy employed during the transfer of the fluid between the source and the sink, expand capacity for an existing system, or lower capital costs for construction of a new system.

Heretobefore, various alternatives have been proposed in an attempt to expand the capacity of an existing heat transfer system or to reduce the amount of energy employed in continuously circulating fluids in heat transfer applications. It is disclosed that polymeric materials can be added to fluids in order to reduce the amount of circulation energy. See, for example, Cho and Hartnett, *Advances in Heat Transfer*, 15, pg. 59 (1981). Unfortunately, such polymeric drag reduction additives significantly reduce the heat transfer coefficient of the aqueous fluids which are employed. In addition, polymeric drag reduction additives are mechanically degraded due to the shearing action of pumps, and the like.

In view of the deficiencies of the prior art, it is highly desirable to provide a fluid for use in heat transfer applications which provides both good heat transfer properties and low flow friction.

SUMMARY OF THE INVENTION

Accordingly, in one aspect, the present invention is a method for improving heat exchange fluids wherein a fluid is contacted with a functionally effective amount of (1) a surfactant compound having a hydrophobic moiety chemically bonded to an ionic, hydrophilic moiety (hereinafter a surfactant ion), and (2) an electrolyte having a moiety that is capable of associating with the surfactant ion to form a viscoelastic surfactant, and optionally (3) a further amount of an electrolyte having a moiety that is capable of associating with the surfactant ion. For purposes of this invention, a viscoelastic surfactant is a compound having (1) an ion capable of acting as a surfactant and (2) a stoichiometric amount of a counterion that associates with the surfactant ion to render it viscoelastic as defined hereinafter. The further amount of electrolyte can be the same or different from that counterion associated with the surfactant ion. The resulting viscoelastic surfactant is employed in an amount sufficient to reduce the amount of friction experienced by the heat transfer fluid in the heat transfer apparatus. The fluids employed in this invention are highly shear stable and do not experience any loss of friction reduction activity with continued pumping, as compared to polymeric drag reduction additives which undergo irreversible mechanical degradation and rapid loss of friction reduction activity with continued pumping.

Surprisingly, the presence of the additional electrolyte in an aqueous liquid containing the viscoelastic surfactant in accordance with the practice of this invention significantly further reduces the friction both over velocities and temperatures experienced by the fluid containing the viscoelastic surfactant as the liquid is employed in heat transfer applications. The admixture of the aqueous liquid, electrolyte and viscoelastic surfactant is significantly more shear stable than an aqueous liquid containing a polymer capable of providing the aqueous liquid with the same degree of friction reduction.

In another aspect, the present invention is a method for imparting shear stable heat transfer properties to fluids through the use of a nonionic viscoelastic surfactant. This method comprises contacting said aqueous liquid with a functionally effective amount of a surfactant compound having a hydrophobic moiety chemically bonded to a nonionic, hydrophilic moiety (hereinafter a nonionic surfactant), which compound is capable of exhibiting a viscoelastic character. The nonionic viscoelastic surfactant is employed in an amount sufficient to reduce the amount of friction experienced by the heat transfer fluid as it is employed in the heat transfer apparatus.

The method of this invention is useful in those processes where fluids are employed in general lubricating and heat transfer applications such as various closed-loop recirculating systems. Of particular interest are district heating applications and hydronic heating, cooling applications, and the like.

DETAILED DESCRIPTION OF THE INVENTION

As used herein, the term "fluid" refers to those fluid materials which can be employed in heat transfer applications. Heat transfer fluids can be organic or aqueous in nature. Most preferably, the fluid is an aqueous liquid. As used herein, the term "aqueous liquid" refers to those liquids which contain water. Included within the term are aqueous liquids containing inorganic electrolytes, such as aqueous solutions of inorganic salts, aqueous alkaline or aqueous acidic solutions, depending upon the particular surfactant and electrolyte employed, e.g., an aqueous solution of an alkali metal or alkaline earth metal hydroxide. Other exemplary aqueous liquids include mixtures of water and a water-miscible liquid such as lower alkanols, e.g., methanol, ethanol or propanol; glycols and polyglycols and the like, provided that such water-miscible liquids are employed in amounts that do not deleteriously affect the viscoelastic properties of the aqueous liquid. Also included are emulsions of immiscible liquids in the aqueous liquid, aqueous slurries of solid particulates such as corrosion inhibitors, biocides or other toxicants. In general, however, water and aqueous alkaline, aqueous acidic or aqueous inorganic salt solutions (i.e., brine solutions) are most beneficially employed as the aqueous liquid herein. Advantageously, the electrolyte concentration is less than about 75, preferably less than about 15, more preferably less than 5, especially less than 1, percent by weight of the solution. Most preferably, the aqueous liquid is water.

The term "viscoelastic" as it applies to liquids, means a viscous liquid having elastic properties, i.e., the liquid at least partially returns to its original form when an applied stress is released. The property of viscoelasticity is well-known in the art and reference is made to H. A. Barnes et al., *Rheol. Acta,* 1975 14, pp. 53–60 and S.

Gravsholt, *Journal of Coll. and Interface Sci.,* 57 (3) pp. 575–6 (1976), which are hereby incorporated by reference for a definition of viscoelasticity and tests to determine whether a liquid possesses viscoelastic properties. See also, N. D. Sylvester et al., *Ind. Eng. Chem. Prod. Res. Dev.,* 1979, 14, p. 47. Of the test methods specified by these references, one test which has been found to be most useful in determining the viscoelasticity of an aqueous solution consists of swirling the solution and visually observing whether the bubbles created by the swirling recoil after the swirling is stopped. Any recoil of the bubbles indicates viscoelasticity.

Surfactant compounds within the scope of this invention include compounds broadly classified as surfactants which, through the proper choice of counterion structure and environment, give viscoelasticity. The term "surfactant" is taken to mean any molecule having a characteristic amphiphatic structure such that it has the property of forming colloidal clusters, commonly called micelles, in solution.

In general, ionic surfactant compounds comprise an ionic hydrophobic molecule having an ionic, hydrophilic moiety chemically bonded to a hydrophobic moiety (herein called a surfactant ion) and a counterion sufficient to satisfy the charge of the surfactant ion. Examples of such surfactant compounds are represented by the formula:

$$R_1(Y^{\oplus})X^{\ominus} \text{ or } R_1(Z^{\ominus})A^{\oplus}$$

wherein $R_1(Y^{\oplus})$ and $R_1(Z^{\ominus})$ represent surfactant ions having a hydrophobic moiety represented by $R_1$ and an ionic, solubilizing moiety represented by the cationic moiety $(Y^{\oplus})$ or the anionic moiety $(Z^{\ominus})$ chemically bonded thereto. $X^{\ominus}$ and $A^{\oplus}$ are the counterions associated with the surfactant ions.

In general, the hydrophobic moiety (i.e., $R_1$) of the surfactant ion is hydrocarbyl or inertly substituted hydrocarbyl wherein the term "inertly substituted" refers to hydrocarbyl radicals having one or more substituent groups, e.g., halo groups such as -F, -Cl or -Br or chain linkages, such as a silicon linkage (-Si-), which are inert to the aqueous liquid and components contained therein. Typically, the hydrocarbyl radical is an aralkyl group or a long chain alkyl or inertly substituted alkyl, which alkyl groups are generally linear and have at least about 12, advantageously at least about 16, carbon atoms. Representative long chain alkyl and alkenyl groups include dodecyl (lauryl), tetradecyl (myristyl), hexadecyl (cetyl), octadecenyl (oleyl), octadecyl (stearyl) and the derivatives of tallow, coco and soya. Preferred alkyl and alkenyl groups are generally alkyl and alkenyl groups having from about 14 to about 24 carbon atoms, with octadecyl, hexadecyl, erucyl and tetradecyl being the most preferred.

The cationic, hydrophilic moieties (groups), i.e., $(Y^{\oplus})$, are generally onium ions wherein the term "onium ions" refers to a cationic group which is essentially completely ionized in water over a wide range of pH, e.g., pH values from about 2 to about 12. Representative onium ions include quaternary ammonium groups, i.e., $-N^{\oplus}(R)_3$; tertiary sulfonium groups, i.e., $-S^{\oplus}(R)_2$; quaternary phosphonium groups, i.e., $-P^{\oplus}(R)_3$ and the like, wherein each R is individually a hydrocarbyl or inertly substituted hydrocarbyl. In addition, primary, secondary and tertiary amines, i.e., $-NH_2$, $-NHR$ or $-N(R)_2$, can also be employed as the ionic moiety if the pH of the aqueous liquid being used is such that the amine moieties will exist in ionic form. A pyridinium moiety can also be employed. Of such cationic groups, the surfactant ion of the viscoelastic surfactant is preferably prepared having quaternary ammonium, i.e., $-N^{\oplus}(R)_3$; a pyridinium moiety; an aryl- or alkarylpyridinium; or imadazolinium moiety; or tertiary amine, $-N(R)_2$, groups wherein each R is independently an alkyl group or hydroxyalkyl group having from 1 to about 4 carbon atoms, with each R preferably being methyl, ethyl or hydroxyethyl.

Representative anionic, solubilizing moieties (groups) $(Z^{\ominus})$ include sulfate groups, i.e., $-OSO_3^{\ominus}$, ether sulfate groups, sulfonate groups, i.e., $-SO_3^{\ominus}$, carboxylate groups, phosphate groups, phosphonate groups, and phosphonite groups. Of such anionic groups, the surfactant ion of the viscoelastic surfactants is preferably prepared having a carboxylate or sulfate group. For purposes of this invention, such anionic solubilizing moieties are less preferred than cationic moieties.

Fluoroaliphatic species suitably employed in the practice of this invention include organic compounds represented by the formula:

$$R_fZ^1$$

wherein $R_f$ is a saturated or unsaturated fluoroaliphatic moiety, preferably containing a $F_3C-$ moiety and $Z^1$ is an ionic moiety or potentially ionic moiety. The fluoroaliphatics can be perfluorocarbons. Suitable anionic and cationic moieties will be described hereinafter. The fluoroaliphatic moiety advantageously contains from about 3 to about 20 carbons wherein all can be fully fluorinated, preferably from about 3 to about 10 of such carbons. This fluoroaliphatic moiety can be linear, branched or cyclic, preferably linear, and can contain an occasional carbon-bonded hydrogen or halogen other than fluorine, and can contain an oxygen atom or a trivalent nitrogen atom bonded only to carbon atoms in the skeletal chain. More preferable are those linear perfluoroaliphatic moieties represented by the formula: $C_nF_{2n+1}$ wherein n is in the range of about 3 to about 10. Most preferred are those linear perfluoroaliphatic moieties represented in the paragraphs below.

The fluoroaliphatic species can be a cationic perfluorocarbon and is preferably selected from a member of the group consisting of $CF_3(CF_2)_rSO_2NH(CH_2)_sN^{\oplus}R''_3X^{\ominus}$; $R_FCH_2CH_2SCH_2CH_2N^{\oplus}R''_3X^{\ominus}$ and $CF_3(CF_2)_rCONH(CH_2)_sN^{\oplus}R''_3X^{\ominus}$; wherein $X^{\ominus}$ is a counterion described hereinafter, $R''$ is lower alkyl containing between 1 and about 4 carbon atoms, r is about 2 to about 15, preferably about 2 to about 6, and s is about 2 to about 5. Examples of other preferred cationic perfluorocarbons, as well as methods of preparation, are those listed in U.S. Pat. No. 3,775,126.

The fluoroaliphatic species can be an anionic perfluorocarbon and is preferably selected from a member of the group consisting of $CF_3(CF_2)_pSO_2O^{\ominus}A^{\oplus}$, $CF_3(CF_2)_pCOO^{\ominus}A^{\oplus}$, $CF_3(CF_2)_pSO_2NH(CH_2)_qSO_2O^{\ominus}A^{\oplus}$ and $CF_3(CF_2)_pSO_2NH(CH_2)_qCOO^{\ominus}A^{\oplus}$; wherein p is from about 2 to about 15, preferably about 2 to about 6, q is from about 2 to about 4, and $A^{\oplus}$ is a counterion described hereinafter. Examples of other preferred anionic perfluorocarbons, as well as methods of preparation, are illustrated in U.S. Pat. No. 3,172,910.

The counterions (i.e., $X^{\ominus}$ or $A^{\oplus}$) associated with the surfactant ions are most suitably ionically charged, organic materials having ionic character opposite that of the surfactant ion, which combination of counterion and surfactant ion imparts viscoelastic properties to an aqueous liquid. The organic material having an anionic character serves as the counterion for a surfactant ion having a cationic, hydrophilic moiety, and the organic material having a cationic character serves as the counterion for the surfactant ion having an anionic, hydrophilic moiety. In general, the preferred counterions exhibiting an anionic character contain a carboxylate, sulfonate or phenoxide group wherein a "phenoxide group" is ArO$^\ominus$ and Ar represents an aromatic ring or inertly substituted aromatic ring. Representative of such anionic counterions which, when employed with a cationic surfactant ion, are capable of imparting viscoelastic properties to an aqueous liquid include various aromatic carboxylates such as o-hydroxybenzoate; m- or p-chlorobenzoate, methylene bis-salicylate and 3,4-, 3,5- or 2,4-dichlorobenzoate; aromatic sulfonates such as p-toluene sulfonate and naphthalene sulfonate; phenoxides, particularly substituted phenoxides; and the like, where such counterions are soluble; or 4-amino-3,5,6-trichloropicolinate. Alternatively, the cationic counterions can contain an onium ion, most preferably a quaternary ammonium group. Representative cationic counterions containing a quaternary ammonium group include benzyl trimethyl ammonium or alkyl trimethyl ammonium wherein the alkyl group is advantageously octyl, decyl, dodecyl, erucyl, and the like; and amines such as cyclohexyl amine. It is highly desirable to avoid stoichiometric amounts of surfactant and counterion when the alkyl group of the counterion is large. The use of a cation as the counterion is generally less preferred than the use of an anion as the counterion. Inorganic counterions, whether anionic or cationic, can also be employed.

The particular surfactant ion and the counterion associated therewith are selected such that the combination imparts viscoelastic properties to an aqueous liquid. Of the aforementioned surfactant ions and counterions, those combinations which form such viscoelastic surfactants will vary and are easily determined by the test methods hereinbefore described. Of the surfactants which impart viscoelastic properties to an aqueous liquid, the preferred surfactant compounds include those represented by the formula:

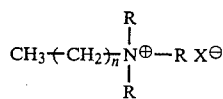

wherein n is an integer from about 13 to about 23, preferably an integer from about 15 to about 21; each R is independently hydrogen or an alkyl group, or alkylaryl, or a hydroxyalkyl group having from 1 to about 4 carbon atoms, preferably each R is independently methyl, hydroxyethyl, ethyl or benzyl, and X$^\ominus$ is o-hydroxy benzoate, m- or p-halobenzoate or an alkylphenate wherein the alkyl group is advantageously from 1 to about 4 carbon atoms. In addition, each R can form a pyridinium moiety. Especially preferred surfactant ions include cetyltrimethylammonium, oleyltrimethylammonium, erucyltrimethylammonium and cetylpyridinium.

Other preferred surfactant compounds include those represented by the formula:

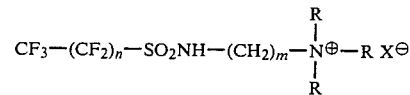

wherein n is an integer from about 5 to about 15, preferably from about 3 to about 8; m is an integer from about 2 to about 10, preferably from about 2 to about 5; R is as previously defined, most preferably methyl; and X$^\ominus$ is as previously defined.

The viscoelastic surfactants are easily prepared by admixing the basic form of the desired cationic surfactant ion (or acidic form of the desired anionic surfactant ion) with a stoichiometric amount of the acidic form of the desired cationic counterion (or basic form of the desired anionic counterion). Alternatively, stoichiometric amounts of the salts of the cationic surfactant ion and the anionic counterion (or equimolar amounts of the anionic surfactant ion and cationic counterion) can be admixed to form the viscoelastic surfactant. See, for example, the procedures described in U.S. Pat. 2,541,816.

In general, surfactant compounds having a hydrophobic moiety chemically bonded to a nonionic, hydrophilic moiety are those nonionic surfactants which exhibit a viscoelastic character, and are typically described in U.S. Pat. No. 3,373,107; and those alkylphenyl ethoxylates as are described by Shinoda in *Solvent Properties of Surfactant Solutions*, Marcel Dekker, Inc. (1967), which are incorporated herein by reference. Preferred nonionic surfactants are those tertiary amine oxide surfactants which exhibit viscoelastic character. In general, the hydrophobic moiety can be represented as the previously described $R_1$. It is understood that the nonionic surfactant can be employed in the process of this invention in combination with an additional amount of an electrolyte as described hereinafter. It is also desirable to employ an additive such as an alkanol in the aqueous liquid to which the nonionic surfactant is added in order to render the surfactant viscoelastic.

Other viscoelastic surfactants which can be employed in the process of this invention are described by D. Saul et al., *J. Chem. Soc, Faraday Trans.*, 1 (1974) 70(1), pp. 163–170.

The viscoelastic surfactant (whether ionic or nonionic in character) is employed in an amount sufficient to impart viscoelastic properties to the fluid, wherein the viscoelasticity of the fluid is measured by the techniques described herein. In general, such amount of viscoelastic surfactant is sufficient to measurably reduce the friction exhibited by the fluid as it is employed in heat transfer applications. The specific viscoelastic surfactant employed and the concentration thereof in the fluid are dependent on a variety of factors including solution composition, temperature, and shear rate to which the flowing fluid will be subjected. In general, the concentration of any specific viscoelastic surfactant most advantageously employed herein is easily determined by experimentation. In general, the viscoelastic surfactants are preferably employed in amounts ranging from about 0.01 to about 10 weight percent based on the weight of the surfactant and fluid. The viscoelastic surfactant is more preferably employed in amounts from about 0.05 to about 1 percent based on the weight of the fluid and the viscoelastic surfactant.

In one highly preferred aspect of the practice of this invention, an electrolyte having an ionic character opposite to that of the surfactant ion and capable of being associated as an organic counterion with said surfactant ion is employed in an additional amount to further reduce the friction exhibited by the fluid containing the viscoelastic surfactant and to increase the temperature to which the fluid will maintain drag reduction. Such electrolytes most suitably employed herein include those containing organic ions which, when associated with the surfactant ions of the surfactant compound, form a viscoelastic surfactant. The organic electrolyte, when present in an excess of that which stoichiometrically associates with the surfactant ion, is capable of further reducing friction of the fluid and to increase the temperature to which the fluid will maintain drag reduction. Such organic electrolyte is soluble in the fluid containing the viscoelastic surfactant.

The concentration of the organic electrolyte required in the fluid to impart the further reduction in friction and increase the temperature to which the fluid will maintain drag reduction is dependent on a variety of factors including the particular fluid, viscoelastic surfactant and organic electrolyte employed, and the achieved reduction in drag. In general, the concentration of the organic electrolyte will advantageously range from about 0.1 to about 20, preferably from about 0.5 to about 5, moles per mole of the viscoelastic surfactant.

In general, the organic ions are formed by the dissociation of corresponding organic electrolytes, including salts and acids or bases of a suitable organic ion. For example, an organic electrolyte which, upon dissociation, forms an anion will further reduce the friction of a fluid containing a viscoelastic surfactant having a cationic surfactant ion. Examples of such anionic organic electrolytes include the alkali metal salts of various aromatic carboxylates such as the alkali metal aromatic carboxylates, e.g., sodium salicylate and potassium salicylate and disodium methylenebis(salicylate); alkali metal ar-halobenzoates, e.g., sodium p-chlorobenzoate, potassium m-chlorobenzoate, sodium 2,4-dichlorobenzoate and potassium 3,5-dichlorobenzoate; aromatic sulfonic acids such as p-toluene sulfonic acid and the alkali metal salts thereof; napthalene sulfonic acid; substituted phenols, e.g., ar,ar-dichlorophenols, 2,4,5-trichlorphenol, t-butylphenol, t-butylhydroxyphenol, ethylphenol, and the like.

A cationic organic electrolyte which, upon dissociation, forms a cation is also useful in further reducing the friction of a fluid containing a viscoelastic surfactant having an anionic surfactant ion. While cationic organic electrolytes are less preferred than the aforementioned anionic organic electrolytes, examples of suitable cationic electrolytes include the quaternary ammonium salts such as alkyl trimethylammonium halides and alkyl triethylammonium halides wherein the alkyl group advantageously contains 4 to 22 carbons and the halide advantageously is chloride; aryl and aralkyl trimethyl ammonium halides such as phenyl trimethyl and benzyl trimethyl ammonium chloride; alkyl trimethyl phosphonium halides and the like. Also desirable is cyclohexyl amine. It is highly desirable to avoid stoichiometric amounts of surfactant and counterion when the alkyl group of the counterion is large (i.e., greater than about 8).

Preferably, the organic electrolyte is the same or generates the same ion associated with the surfactant ion of the viscoelastic surfactant contained by the aqueous liquid, e.g., alkali metal salicylate is advantageously employed as the additional organic electrolyte when the viscoelastic surfactant is originally prepared having a salicylate or p-toluene sulfonate counterion. Therefore, the most preferred organic electrolytes are the alkali metal salts of an aromatic carboxylate, for example, sodium salicylate or sodium p-toluene sulfonate. Moreover, it is also understood that the electrolyte can be different from the counterion which is employed.

It is also possible to employ a water-insoluble active ingredient such as an oil or other organic ingredient emulsified in water at a concentration of about 0.05 to about 80 percent. Viscoelastic surfactants (whether ionic or nonionic in character) employed in such emulsions tend to lose their viscoelasticity. This is believed to be due to the fact that the oil penetrates the micelles and destroys the aggregates required for viscoelasticity. Viscoelastic surfactants containing excess organic electrolyte are capable of withstanding the addition of oil to aqueous liquids for longer periods of time than those viscoelastic surfactants without the excess organic electrolyte. However, fluorinated viscoelastic surfactants are able to withstand the addition of oil to the aqueous liquid in amounts up to about 80 weight percent, most preferably up to about 20 weight percent for a longer period of time.

The fluids which exhibit reduced friction when used in industrial heat transfer applications are prepared by admixing the desired amounts of the viscoelastic surfactant and organic electrolyte to form a fluid solution. Alternatively, the nonionic surfactant is contacted with the fluid to form an aqueous liquid solution. The resulting solutions are stable and can be stored for long periods of time. The fluids also comprise additives in order that said liquids can be employed for numerous industrial purposes. Examples of industrial uses include district heating or hydronic heating in buildings.

The fluids employed in the process of this invention can exhibit heat transfer coefficients over a flow rate/temperature range which are lower than fluids not containing the viscoelastic additives. However, the fluids employed in this invention exhibit heat transfer coefficients similar to that of a fluid not containing the viscoelastic additives at or above a critical temperature or Reynolds Number. Thus, it is possible to provide good heat transfer in a high temperature heat exchange region, while providing drag reduction and a low heat transfer coefficient in the distribution lines.

The critical temperature and Reynolds number can depend on the surfactant ion structure and the counterion concentration of the viscoelastic surfactant. For example, longer alkyl chain length surfactant ions and/or an excess of counterion can be employed to provide a fluid having a higher critical temperature and Reynolds number than in comparable fluid formulations. Thus, it is possible to design heat transfer fluids which can be designed to match the particular flow rate requirements and temperature of a wide variety of heat transfer applications.

The fluids employed in the process of this invention can be employed under conditions in which previously known heat transfer fluids have been employed. Preferred applications include those processes where heat exchange apparatus is operated between about $-40°$ C. and about $150°$ C. For example, compositions can be designed in order to match the temperature conditions and flow rate requirements in order to achieve heat transfer in a hot exchanger in a heating plant. However, the compositions have the desired drag reduction and lower heat transfer coefficient in the cooler distribution lines.

The following examples are presented to illustrate the invention and should not be construed to limit its scope. All percentages and parts are by weight unless otherwise noted.

EXAMPLE 1

An aqueous composition containing 0.2 part of a viscoelastic surfactant of cetyltrimethylammonium salicylate is prepared by admixing equimolar amounts of cetyltrimethylammonium chloride and sodium salicylate in the form of 303.5 g of a formulation comprising 50 percent cetyltrimethylammonium chloride in isopropanol and water, 76 g sodium salicylate, and enough water to provide 100 liters of solution. This composition is designated as Sample 1.

In order to determine the friction exhibited by the solution under flow conditions and the heat transfer properties of the solution, a pipe flow test loop is prepared. The test loop comprises a pumping system, a heating and cooling system and a testing system.

A centrifugal pump is responsible for pumping the fluid around the loop. Its maximum output is approximately 150 gal./min. and the dead head pressure is around 75 psi. The rest of the loop consists of a heat exchanger, a mass flow meter, a test section, and a 20-gal. expansion tank with a 3-inch bypass. The loop is about 70 feet long and is stainless steel. Except for the bypass and the lines to and from the 20-gal. tank which are 3 inches in diameter, all the lines are 2 inches in diameter. All of the valves in this loop are ball valves except for three butterfly valves in the 3 inch lines around the 20-gal. tank. The centrifugal pump is capable of handling slurries and the loop itself is built with long radius bends to reduce abrasion. A convenient sample size for testing in the loop is 100 liters (about 30 gallons).

In order to prevent cavitation in the pump during start-up and air entrapment, a 2 inch diameter 3 feet extension has been placed in the 20-gal. tank. When the system is being filled the test fluid is pulled by vacuum all the way around the loop and then into the tank. Once the system is filled there are no air legs in the lines. The valve on the bypass is closed half way when running to divide the flow between the by-pass and the expansion tank and allow air bubbles to escape in the tank.

Heating and cooling the pipe flow test loop are done by 400 lb. steam regulated at 100 psi and tap water using two heat exchangers. The first heat exchanger heats or cools an intermediate heat transfer fluid with the steam or tap water. The intermediate heat transfer fluid is pumped to the second main heat exchanger which heats or cools the test fluid. The intermediate heat transfer fluid is water containing a corrosion inhibitor. Temperature probes are placed at the inlets and outlets of the main heat exchanger to gather heat transfer data. A solenoid valve is placed in the water/steam drain line in order to increase the pressure and, therefore, increase the temperature in the water/steam loop. Temperatures of between 35° C. and 120° C. in the main pipe flow test loop can be reached with this procedure.

The testing system comprises of the instrumentation discussed herein and a 20 feet long test section. This test section has 4-2 mm diameter pressure taps drilled 45 cm apart near the center of the pipe. They do not disturb the flow field in the pipe. The entrance length from the last disturbance before the pressure taps (the flow control valve) exceeds 50 times the diameter of the pipe in order that the taps should be in fully developed turblent flow. The two important instruments on the pipe flow test loop are the Micro Motion Mass Flow Meter Model C200 (Micro Motion Inc., Boulder, Colorado) and the Signature Differential Pressure Transmitter Model 2408-30B (Bristol Babcock Inc., Waterbury, Connecticut).

In this example, separate portions of Sample No. 1 are passed through the circular conduit at 40° C. using the various flow rates specified in Table I. These flow conditions result in various pressure drops of the liquid flowing in the circular conduit. From the measured pressures and velocities, the friction factors specified in Table I are calculated using the equation:

$$f = \frac{D\Delta P2}{4\rho L V^2}$$

wherein:
f = Fanning friction factor
D = diameter of the circular conduit through which the liquid is passed, expressed in cm
$\Delta P$ = pressure drop of the liquid as it flows through the circular conduit in dynes/cm$^2$.
$\rho$ = density of aqueous liquid in g/cm$^3$
L = length of conduit through which liquid flows in cm
V = velocity of liquid in cm/sec The Reynolds number is calculated using the equation:

$$Re = \frac{DV\rho}{\mu}$$

wherein:
Re = Reynolds number
$\mu$ = viscosity in poise.
and D, V and $\rho$ are previously defined.

Data concerning friction of the composition is presented in Table I for samples at 40° C.

TABLE I

| Sample | Velocity cm/sec | Pressure dynes/sq · cm (10$^3$) | Solvent Reynolds Number (10$^4$) | Fanning Friction Factor (10$^{-3}$) |
|---|---|---|---|---|
| C-1* | 75 | 1.16 | 6.03 | 6.02 |
| C-1* | 113 | 2.50 | 9.05 | 5.75 |
| C-1* | 150 | 4.20 | 12.0 | 5.43 |
| C-1* | 188 | 6.94 | 15.0 | 5.74 |
| C-1* | 225 | 9.82 | 18.1 | 5.65 |
| C-1* | 263 | 12.9 | 21.1 | 5.46 |
| C-1* | 300 | 17.5 | 24.1 | 5.66 |
| C-1 | 338 | 21.3 | 27.1 | 5.45 |
| C-1* | 375 | 24.9 | 30.1 | 5.15 |
| 1 | 75 | 0.641 | 6.03 | 3.31 |
| 1 | 113 | 0.987 | 9.05 | 2.27 |
| 1 | 150 | 1.65 | 12.0 | 2.14 |
| 1 | 188 | 2.24 | 15.0 | 1.85 |
| 1 | 225 | 2.95 | 18.1 | 1.69 |
| 1 | 263 | 3.75 | 21.1 | 1.58 |
| 1 | 300 | 4.74 | 24.1 | 1.53 |
| 1 | 338 | 5.79 | 27.1 | 1.48 |
| 1 | 375 | 14.1 | 30.1 | 2.93 |

*Not an example of the invention. Sample C-1 is tap water.

The data in Table I indicates that the composition containing the viscoelastic surfactant significantly reduces the Fanning Friction Factor over a portion of the Reynolds Number region. It is noted that above a Reynolds Number of about 250,000, the Fanning Friction Number rapidly returns to that of water (i.e., at the critical Reynolds Number).

EXAMPLE 2

An aqueous composition containing 0.2 part cetyltrimethylammonium salicylate and 0.25 part sodium salicylate is prepared by admixing cetyltrimethylammonium chloride in the form of 303.5 g of a formulation comprising 50 percent cetyltrimethylammonium chloride in isopropanol and water, 101 g of sodium salicylate and enough water to provide 100 liters of solution. This sample is designated as Sample 2 and is employed in the system described in Example 1. Data concerning the effect of temperature on friction is obtained at 40° C., 50° C. and 60° C. and is presented in Table II.

TABLE II

| Temperature/ Viscosity | Velocity cm/sec | Pressure dynes/ sq · cm ($10^3$) | Reynolds Number ($10^4$) | Fanning Friction Factor ($10^{-3}$) |
|---|---|---|---|---|
| 40/0.653 | 75 | 1.24 | 6.03 | 6.46 |
| | 150 | 2.29 | 12.0 | 2.97 |
| | 225 | 2.52 | 18.1 | 1.45 |
| | 300 | 3.59 | 24.1 | 1.16 |
| | 375 | 5.37 | 30.1 | 1.11 |
| 50/0.547 | 75 | 1.35 | 7.20 | 7.03 |
| | 150 | 2.23 | 14.4 | 2.89 |
| | 225 | 2.70 | 21.6 | 1.55 |
| | 300 | 3.40 | 28.8 | 1.10 |
| | 375 | 4.73 | 36.0 | 0.979 |
| 60/0.467 | 75 | 1.23 | 8.44 | 6.40 |
| | 150 | 2.71 | 16.8 | 3.50 |
| | 225 | 3.89 | 25.3 | 2.24 |
| | 300 | 5.39 | 33.7 | 1.74 |
| | 375 | 6.02 | 42.2 | 1.24 |
| 70/0.404 | 75 | 1.16 | 9.75 | 6.03 |
| | 150 | 3.35 | 19.5 | 4.33 |
| | 225 | 6.06 | 29.2 | 3.48 |
| | 300 | 9.42 | 39.0 | 3.04 |
| | 375 | 14.5 | 48.7 | 3.01 |
| 80/0.355 | 75 | 1.66 | 11.1 | 8.63 |
| | 150 | 4.54 | 22.2 | 5.88 |
| | 225 | 9.25 | 33.3 | 5.32 |
| | 300 | 15.4 | 44.4 | 4.99 |
| | 375 | 23.9 | 55.5 | 4.95 |

The data in Table II indicates that good drag reduction is maintained through 60° C. for the Sample 2.

EXAMPLE 3

Sample 2 is employed in the system described in Example 1 in order to obtain data concerning the overall heat transfer coefficient as a function of the mass flow rate of the sample. The data is obtained by rapidly heating the intermediate heat transfer fluid to 70° C. and measuring the four temperatures across the counter current concentric cylinder heat exchanger in the test loop at different sample temperatures and flow rates. The overall heat transfer coefficient is calculated using the equations.

$$Q = UA\Delta T_{lm} = mC_p\Delta t$$

wherein:
Q = heat transferred to the test fluid
m = mass flow rate in lb./hr.
$C_p$ = heat capacity of fluid in BTU/lb.—°F.
$\Delta t$ = temperature rise of fluid in passing through the heat exchanger $(t_2 - t_1)$, in °F.

U = overall heat transfer coefficient in BTU/lb.—°F.ft$^2$
A = is area of heat exchanger in ft$^2$
$\Delta T_{lm}$ = logarithmic mean temperature drop in °F. (i.e., $((T_2-t_1) - (T_1-t_2))/(\ln(T_2-t_1)-\ln(T_1-t_2))$)
$T_1/T_2$ = temperature of intermediate heat transfer fluid entering/leaving the annulus of the heat exchanger in °F.
$t_1/t_2$ = temperature of test fluid entering/leaving the heat exchanger in °F.

The data concerning the effect of the temperature and flow rate on the overall heat transfer coefficient for this fluid is presented in Table III.

TABLE III

| | Overall Heat Transfer Coefficient, BTU/(ft$^2$-hr-°F.) | | |
|---|---|---|---|
| Temperature (°C.) | Sample No. 2 | Water Calculated | Mass Flow Rate, lb/minute |
| 40 | 63.1 | — | 167 |
| | 72.9 | — | 430 |
| | 98.5 | — | 643 |
| 50 | 89.8 | 172 | 171 |
| | 79.0 | 181 | 210 |
| | 92.2 | 197 | 317 |
| | 121 | 218 | 642 |
| | 218 | 219 | 638 |
| | 127 | 219 | 648 |
| 60 | 129 | — | 331 |
| | 163 | — | 421 |
| | 264 | — | 654 |

The data in Table III shows that as (1) the flow rate is increased or as (2) the temperature is increased, the overall heat transfer coefficient of the fluid containing the viscoelastic surfactant and hence the individual heat transfer coefficient of the fluid containing the viscoelastic surfactant returns to that individual heat transfer coefficient for water.

EXAMPLE 4

Various viscoelastic surfactant compositions are prepared. The minimum Fanning Friction Number for each composition is obtained at different temperatures between Reynolds Numbers of 60,000 and 550,000 using the procedures and system described in Example 1. Results are presented in Table IV.

TABLE IV

| Temperature °C. | Minimum Fanning Friction Factor (times $10^3$) For Sample No. | | | | |
|---|---|---|---|---|---|
| | 3 | 4 | 5 | 6 | 7 |
| 40 | 1.48 | 1.11 | 1.81 | — | — |
| 50 | 1.29 | 0.979 | 1.24 | 0.420 | 0.904 |
| 60 | 5.12 | 1.24 | 1.00 | 0.714 | 1.08 |
| 70 | 5.09 | 3.01 | 4.90 | 1.57 | 1.01 |
| 80 | 5.04 | 4.99 | — | 4.14 | 1.36 |
| 90 | — | — | — | — | 1.42 |
| 100 | — | — | — | — | 3.13 |
| 110 | — | — | — | — | 4.56 |
| 120 | — | — | — | — | 4.29 |

Sample 3 is 0.2 percent cetyltrimethylammonium salicylate.
Sample 4 is 0.2 percent cetyltrimethylammonium salicylate ± 0.25 percent sodium salicylate.
Sample 5 is 0.2 percent hydrogenated tallow trimethylammonium salicylate.
Sample 6 is 0.2 percent hydrogenated tallow trimethylammonium salicylate ± 0.25 percent sodium salicylate.
Sample 7 is 0.25 percent erucyltrimethylammonium salicylate + 0.125 percent cetyltrimethylammonium salicylate ± 0.2 percent sodium salicylate.

The results of Table IV indicate that the surfactant ion and excess counterion can raise the critical temperature at which the minimum Fanning Friction Number is observed.

The data presented in Tables I–IV indicates that the critical temperature and Reynolds Number depend on both the surfactant ion structure and co-ion concentration of the sample. Thus, viscoelastic surfactant formulations can be designed in order to match the temperature conditions and flow rate requirements in a wide variety of heat transfer applications.

What is claimed is:

1. A method for improving heat exchange fluids wherein a heat exchange fluid is contacted with a funtionally effective amount of (1) a surfactant compound having a hydrophobic moiety chemically bonded to an ionic, hydrophilic moiety and (2) an electrolyte having a moiety that is capable of associating with the surfactant ion to form a viscoeleastic surfactant, and optionally (3) a further amount of an electrolyte having a moiety that is capable of associating with the surfactant ion, which further amount is sufficient to further reduce the friction experienced by the fluid; and which functionally effective amount is a sufficient amount to reduce the amount of friction experienced by the heat transfer fluid in the heat transfer apparatus.

2. A method of claim 1 wherein said surfactant ion is a cationic surfactant.

3. A method of claim 1 wherein said surfactant ion is an anionic surfactant.

4. A method of claim 2 wherein said cationic surfactant is represent by the following formula:

$$R_1(Y^{\oplus})X^{\ominus}$$

wherein $R_1$ is a hydrophobic moiety $Y^{\oplus}$ is a cationic solubilizing moiety chemically bonded to $R_1$, and $X^{\ominus}$ is a counterion associated with $Y^{\oplus}$.

5. A method of Claim 3 wherein said anionic surfactant is represented by the formula:

$$R_1(Z^{\ominus})A^{\oplus}$$

wherein $R_1$ is a hydrophobic moiety, $Z^{\ominus}$ is an anionic solubilizing moiety chemically bonded to $R_1$, and $A^{\oplus}$ is a counterion associated with $Z^{\ominus}$.

6. A method of claim 1 wherein said further amount of counterion is an organic electrolyte.

7. A method of claim 1 wherein said fluid is an aqueous liquid.

8. A method of claim 1 wherein said viscoelastic surfactant is cetyltrimethylammonium salicylate or erucyltrimethylammonium salicylate.

9. A method of claim 1 wherein said further amount of electrolyte which is employed is sodium salicylate.

10. A method of claim 1 wherein said fluid comprises an aqueous liquid and from about 0.01 to about 10 weight percent of said viscoelastic surfactant, based on the weight of said liquid and said surfactant.

11. A method for improving heat exchange fluids wherein a heat exchange fluid is contacted with a functionally effective amount of a surfactant compound having a hydrophobic moiety chemically bonded to a nonionic, hydrophilic moiety, which compound is capable of exhibiting a viscoelastic character.

12. A method of claim 1 wherein a stoichiometric amount of (1) surfactant compound and (2) electrolyte having a moiety that is capable of associating with the surfactant ion, is employed.

13. A method of claim 1 wherein said heat exchange fluid is employed in a closed-loop recirculating system.

14. A method of claim 1 wherein said heat exchange fluid is employed in a district heating application.

15. A method of claim 1 wherein said fluid comprises an aqueous liquid and from about 0.05 to about 1 percent of said viscoelastic surfactant, based on the weight of said liquid and said surfactant.

16. A method of claim 1 wherein said further amount of electrolyte is an organic electrolyte and is included at a concentration ranging from about 0.1 to about 20 moles per mole of the viscoelastic surfactant.

17. A method of claim 1 wherein said heat exchange fluid is employed in a heat exchange apparatus.

18. A method of claim 17 wherein said heat exchange apparatus is operated between about −40° C. and about 150° C.

19. A method of claim 1 wherein said electrolyte is an organic electrolyte.

* * * * *

UNITED STATES PATENT AND TRADEMARK OFFICE
CERTIFICATE OF CORRECTION

PATENT NO. : 4,534,875

DATED : August 13, 1985

INVENTOR(S) : Gene D. Rose

It is certified that error appears in the above-identified patent and that said Letters Patent is hereby corrected as shown below:

Please delete the paragraph under "ABSTRACT" and insert therefor: --Heat exchange fluids are improved by incorporating therein a viscoelastic surfactant composition which comprises a heat exchange fluid and (1) a surfactant compound having a hydrophobic moiety chemically bonded to an ionic, hydrophilic moiety, and (2) an electrolyte having a moiety that is capable of associating with the surfactant ion to form a viscoelastic surfactant, and optionally (3) a further amount of electrolyte. Optionally a nonionic viscoelastic surfactant can be employed. An example of a viscoelastic surfactant composition is cetyltrimethylammonium salicylate. The viscoelastic surfactant is employed in an amount sufficient to reduce the friction experienced by the heat transfer fluid in a heat transfer apparatus while providing good heat transfer. The improved fluids are useful in district heating applications.--

UNITED STATES PATENT AND TRADEMARK OFFICE
CERTIFICATE OF CORRECTION

PATENT NO. : 4,534,875

DATED : August 13, 1985

INVENTOR(S) : Gene D. Rose

It is certified that error appears in the above-identified patent and that said Letters Patent is hereby corrected as shown below:

In Col. 4, line 58, "$CF_3(CF_2)_pSO_2NH(CH_2-$" should read --$CF_3(CF_2)_pSO_2NH(CH_2)-$--.

In Col. 12, Example 4, Table IV, in all instances in which it appears, "±" should read --+--.

In Col. 13, Claim 1, line 14, and bridging line 15, "funtionally" should read --functionally--; line 19, "viscoeleastic" should read --viscoelastic--.

Signed and Sealed this

Twenty-second Day of July 1986

[SEAL]

Attest:

DONALD J. QUIGG

*Attesting Officer*   *Commissioner of Patents and Trademarks*